Dec. 14, 1937.　　　　J. M. GUTHRIE　　　　2,102,149
GLASS MASONRY
Filed April 22, 1937
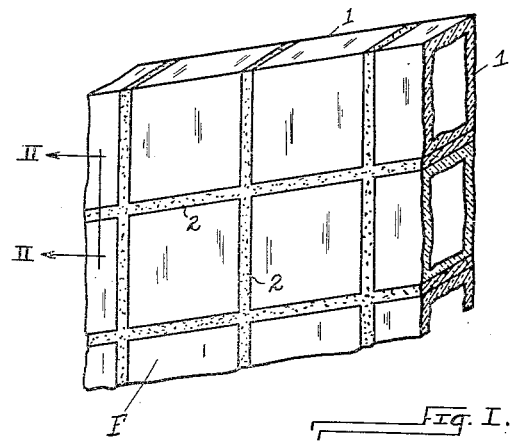
Fig. I.
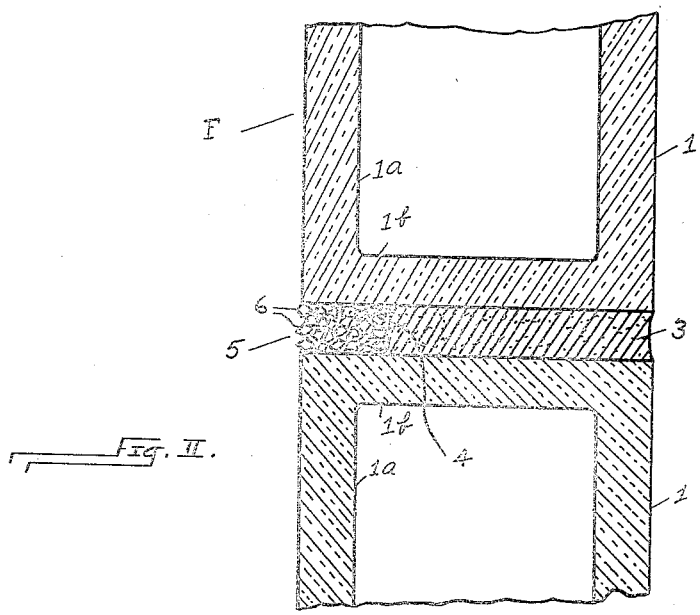
Fig. II.
INVENTOR
James M. Guthrie
BY Christy and Wharton
ATTORNEYS

UNITED STATES PATENT OFFICE 2,102,149

GLASS MASONRY

James M. Guthrie, Mount Lebanon, Pa., assignor of one-half to Joseph C. Keaney, Mount Lebanon, Pa.

Application April 22, 1937, Serial No. 138,392

5 Claims. (Cl. 72—41)

My invention relates to building construction, particularly to masonry walls formed of translucent bricks or blocks of glass. The invention consists in, and the object of the invention is to provide, a translucent wall of masonry in which the mortar joints are wholly translucent, or are so far so as to operate with optical effect upon light transmitted through the body of the wall.

In the accompanying drawing Fig. I is a fragmentary, isometric view of a masonry wall embodying the invention; and Fig. II is a fragmentary, sectional view of the wall on the plane II—II of Fig. I, and shown to larger scale.

The structure of my invention consists in a wall of masonry, made up of translucent, hollow glass blocks 1 of the sort available in open market. The blocks are bonded together and integrated in the wall, by means of mortar.

In accordance with this invention, I provide a translucent mortar of such character that the light transmitted through the bodies of the blocks 1 may enter the mortar and produce pleasing optical effects. The mortar consists in an aggregate of relatively small translucent bodies mixed in a translucent cement. The aggregate advantageously comprises glass crystals, having facets whose dimensions range from 1/64" to 1/4", more or less, and they may be produced by breaking down sheet glass, or glass bottles, or cullet, in a ball or hammer mill. Preferably, the glass is heat treated, to embrittle it before fragmentation, and, upon removal from the mill, it is screened, to separate the desired crystals from the powdered glass and oversized pieces.

The cement or bonding agent of the mortar may comprise an air-hardening, translucent fluid having a coefficient of light refraction approximating that of the glass. A colorless, waterproof, cellulose-base cement of the sort now commonly sold in commerce as waterproof glass cement has been used with success. Alternately, I contemplate that certain of the known translucent resins, or other known translucent varnish and lacquer bases, may be dissolved (in alcohol, butyl acetate, methyl ethyl ketone, or other suitable solvent) to the consistency of a heavy paste or plastic putty, to provide the bonding agent for use in my mortar. In any event the crystalline aggregate is mixed with a translucent bonding material, and, by proportioning the amount of solvent used, the desired physical characteristics are given to the mass, so that it may be used as mortar in laying up the wall.

Whereas it is possible to use my mortar throughout, in laying up the wall, I prefer, for practical reasons, to use ordinary opaque mortar, in laying up and integrating the assembly of blocks. As shown in Fig. II, this opaque mortar 3 will not be continued (in the joints between the blocks) to the exposed face F of the wall, but will be terminated an interval inward, as at 4, of such face, leaving open regions in the mortar joints 2 between the blocks, in which fillets or pointings 5 of my translucent mortar are introduced, and the mortar allowed to dry and solidify. In the finished wall, as viewed in Fig. I, the mortar joints appear as a multiplicity of translucent crystals 6 (Fig. II). Light transmitted or conducted through the wall or body portions 1a and 1b of the blocks enters the translucent mortar. And the glass crystals 6 embodied between and firmly integrated with the blocks 1 operate in effect as a multiplicity of optical prisms in deflecting, refracting and diffusing such light.

In way of elaboration, the crystals in my mortar may be formed of a glass of different color or hue than that of the glass of which the blocks 1 are formed, it being noted that the blocks 1 are ordinarily formed of a substantially colorless glass. Thus, in the mortar joints, and by reflection in the finished wall, I produce color effects both pleasing and artistic, in addition to the optical effects otherwise produced by the crystals 6. Indeed, I have obtained the desired tinting or coloring of the crystals by first dissolving dyes (of the sort now sold on the open market for coloring woolen cloth) in the solvent of the cement or bonding material of the mortar, and then mixing the transparent colored solvent with the cement base and mass of crystals, in such proportions that the desired color and consistency are obtained.

Alternately, the translucent mortar may be substantially colorless, as it is introduced to and hardened in the wall, and the desired tinting may be obtained by applying a coating of dyed, transparent varnish to the areas of the pointings or fillets 5 that are exposed between the blocks 1.

I claim as my invention:

1. A building wall of masonry including translucent blocks of glass laid-up with mortar comprising small, translucent crystalline bodies bonded with a translucent cement, said mortar in the joints between said blocks providing in effect a multiplicity of optical prisms receiving light transmitted through the bodies of said blocks.

2. A building wall of masonry including translucent blocks of glass laid-up with opaque mortar, said opaque mortar being terminated in the joints between said blocks inward of the face of said wall, and a pointing of translucent mortar embodied in said joints between the blocks and outward of said opaque mortar, said translucent mortar comprising small, translucent, crystalline bodies bonded with a translucent cement and (in the exposed portions of the joints between the blocks) providing in effect a multiplicity of optical prisms receiving light transmitted through the bodies of said blocks.

3. A building wall of masonry including translucent blocks of glass laid-up with mortar comprising small, translucent crystalline bodies tinted to a different hue than the bodies of said blocks and bonded with a translucent cement, said mortar in the joints between said blocks providing in effect a multiplicity of optical prisms receiving light transmitted through the bodies of said blocks.

4. A building wall of masonry including translucent blocks of glass laid-up with opaque mortar, said opaque mortar being terminated in the joints between said blocks inward of the face of said wall, and a pointing of translucent mortar embodied in said joints between the blocks and outward of said opaque mortar, said translucent mortar comprising small, translucent, crystalline bodies tinted to a different hue than the bodies of said blocks and bonded with a translucent cement and (in the exposed portions of the joints between the blocks) providing in effect a multiplicity of optical prisms receiving light transmitted through the bodies of said blocks.

5. A building wall of masonry including translucent blocks of glass laid-up with opaque mortar, said opaque mortar being of substantial thickness in the joints between the blocks and terminating in the joints a substantial interval inward from the face of said wall, and a fillet of translucent material, of different color or shade than the translucent bodies of said blocks, embodied in said joints and outward of said opaque mortar and receiving and being illuminated by light transmitted through the bodies of the glass blocks.

JAMES M. GUTHRIE.